Dec. 14, 1926.

C. SCHRAMM 1,610,976

AUTOMATIC MILLING MACHINE

Filed March 30, 1922  6 Sheets-Sheet 1

INVENTOR
Carl Schramm
BY
Joseph W. Schofield
ATTORNEY

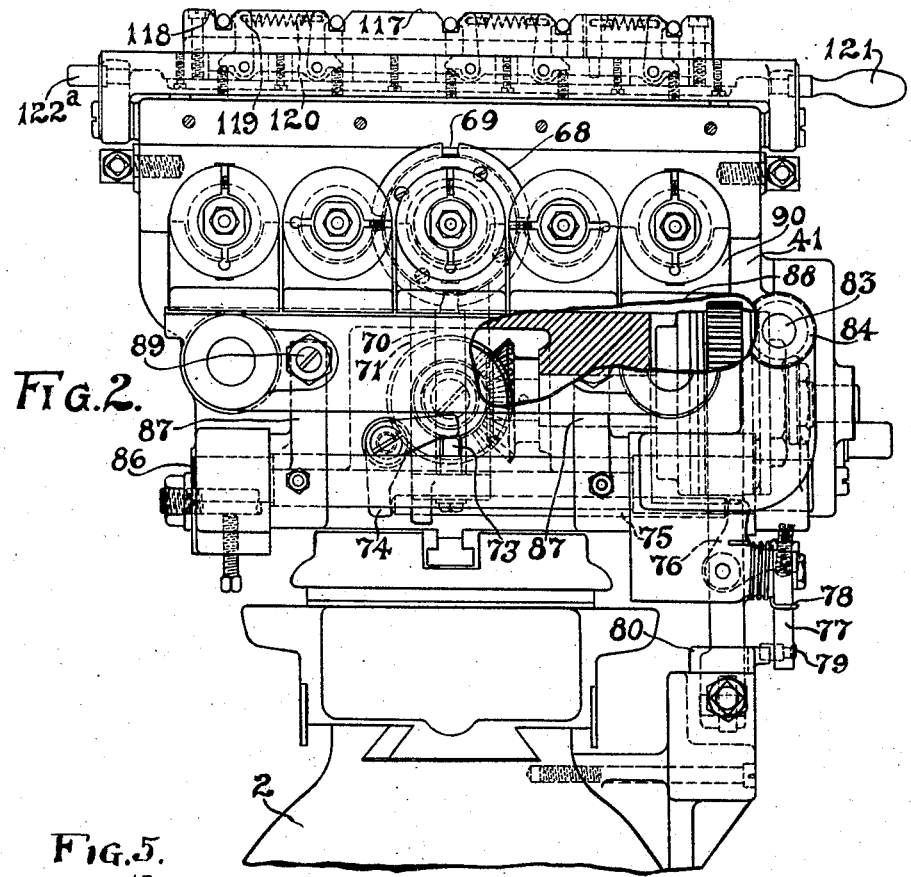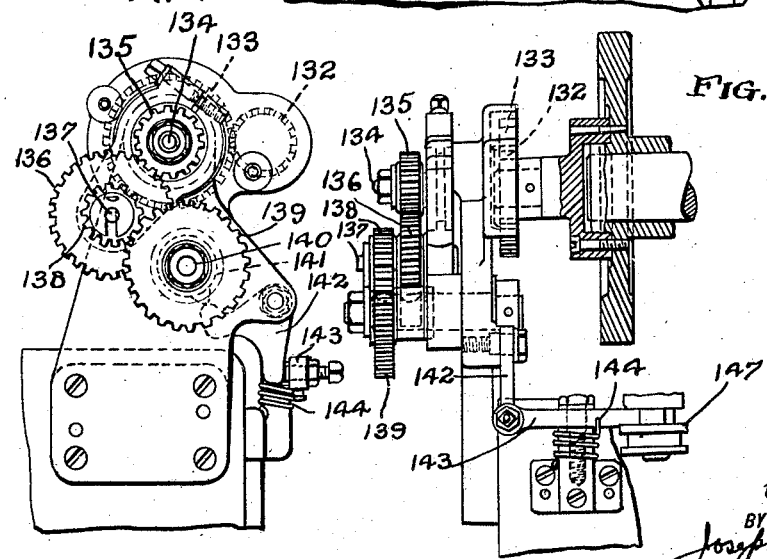

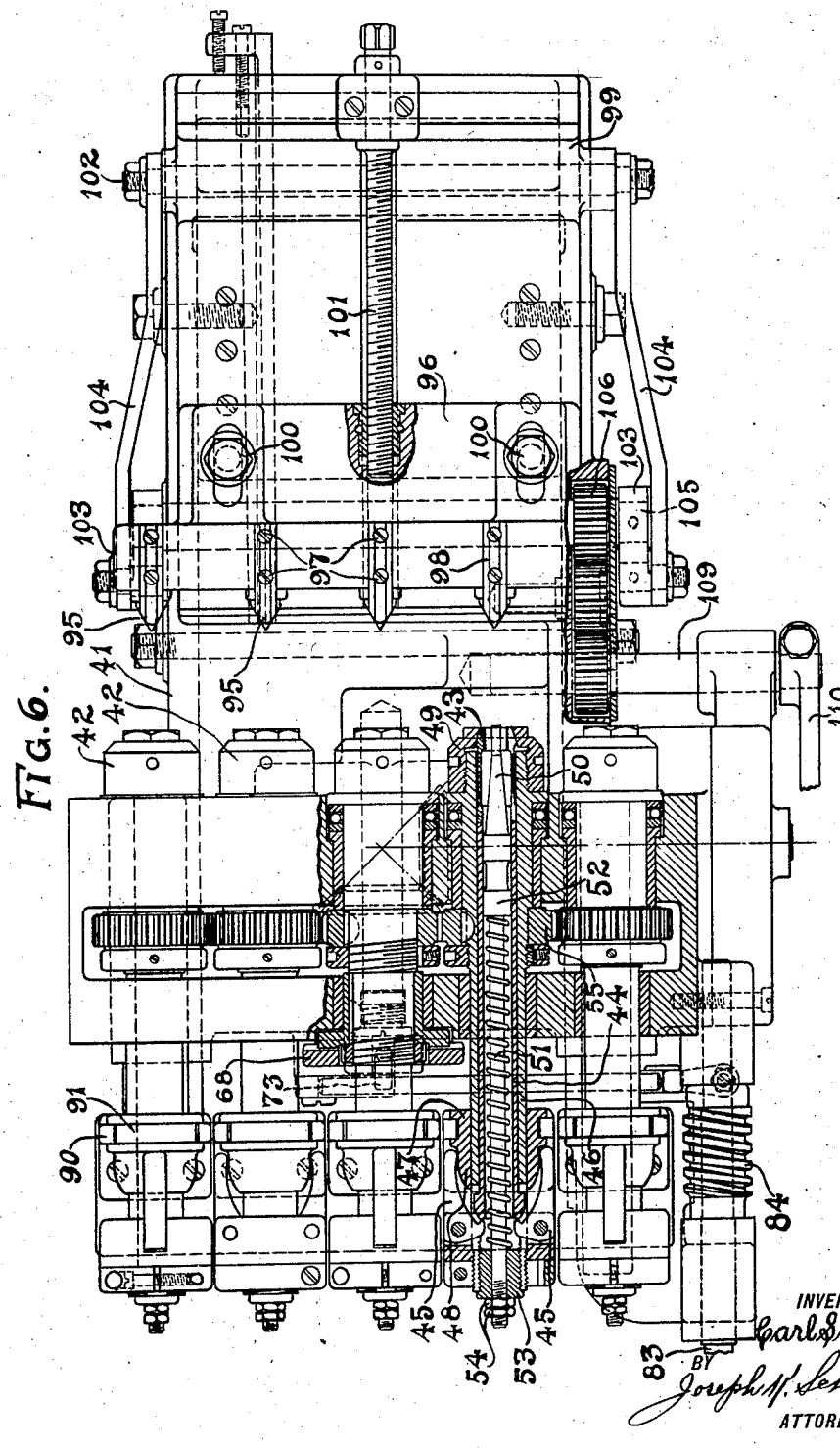

Dec. 14, 1926.
C. SCHRAMM
1,610,976
AUTOMATIC MILLING MACHINE
Filed March 30, 1922      6 Sheets-Sheet 4
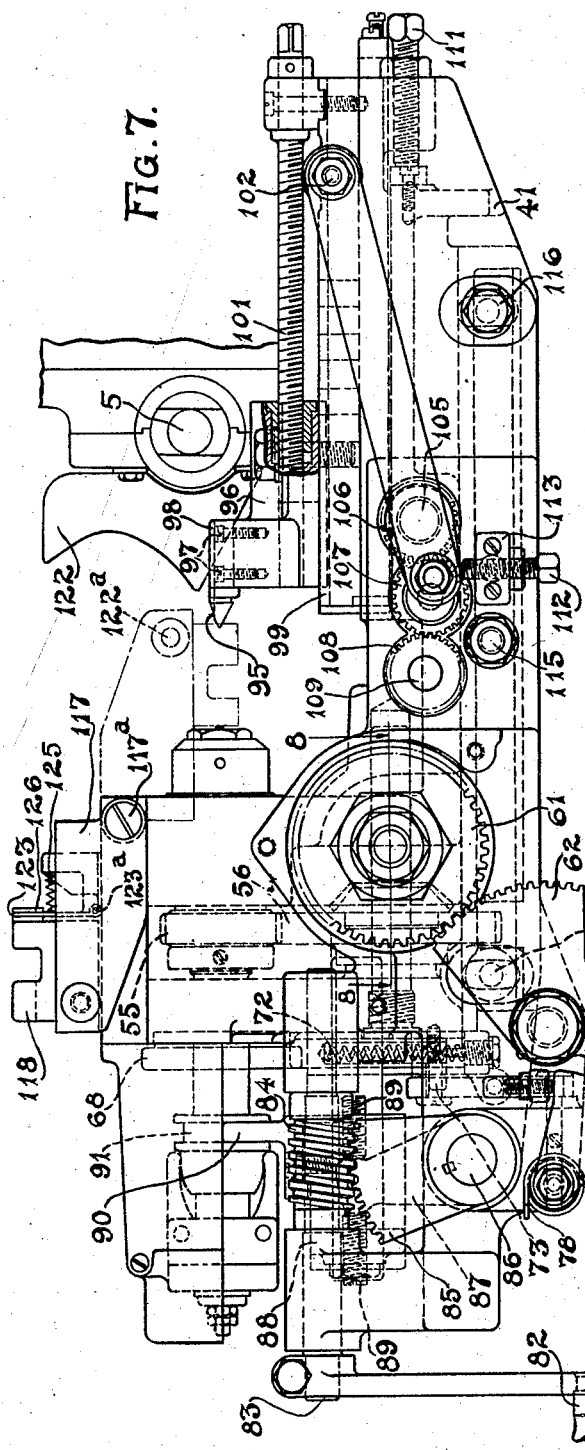
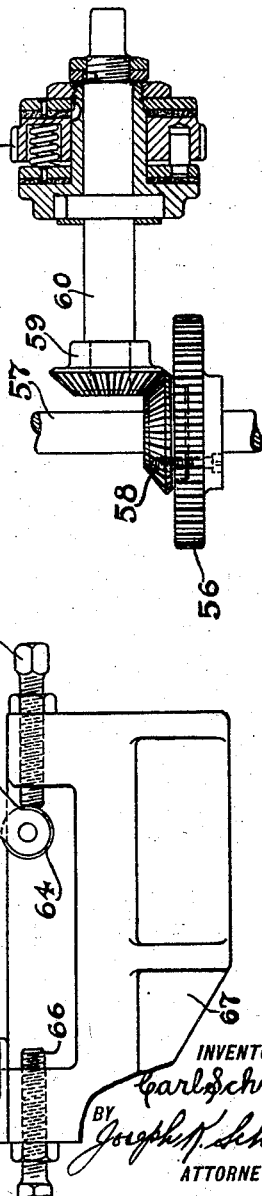
INVENTOR
Carl Schramm
BY
Joseph X. Schofield
ATTORNEY

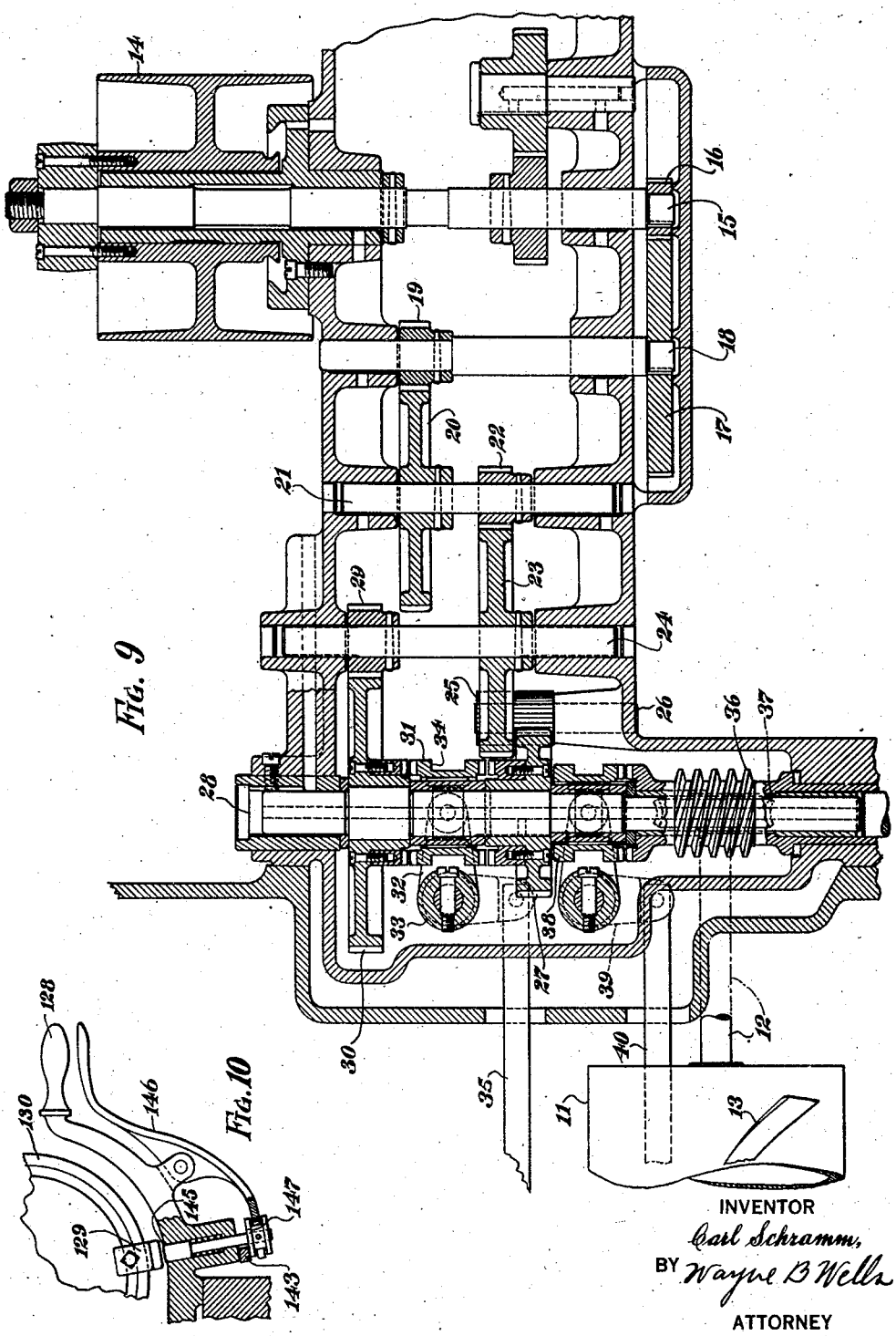

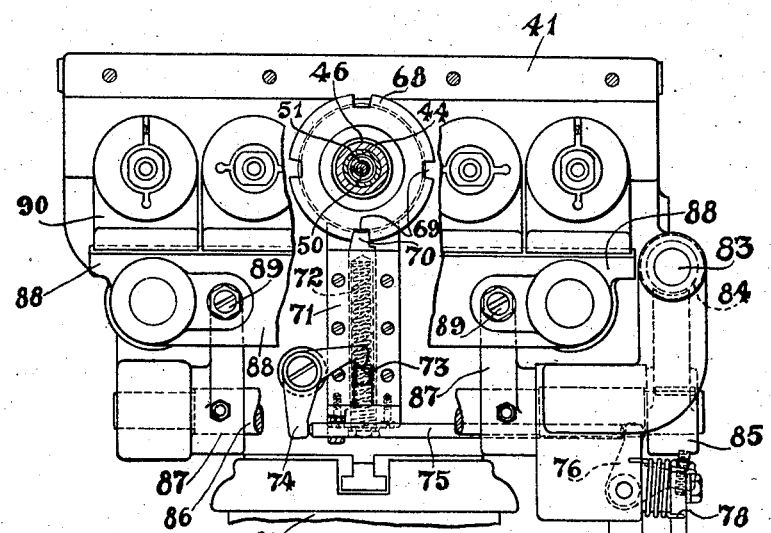
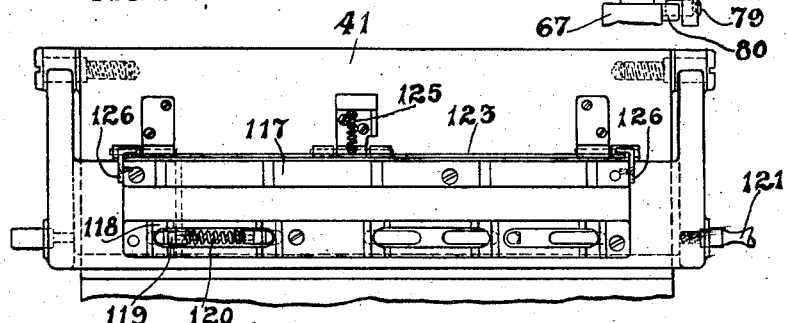
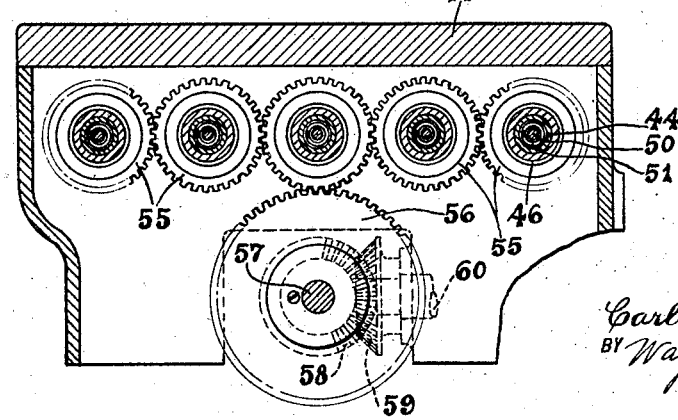

Patented Dec. 14, 1926.

1,610,976

UNITED STATES PATENT OFFICE.

CARL SCHRAMM, OF WEST HARTFORD, CONNECTICUT, ASSIGNOR TO PRATT & WHITNEY COMPANY, OF NEW YORK, N. Y., A CORPORATION OF NEW JERSEY.

AUTOMATIC MILLING MACHINE.

Application filed March 30, 1922. Serial No. 548,034.

My invention relates to milling machines and particularly to automatic milling machines which are adapted to operate simultaneously on a number of pieces of work.

One object of my invention is to provide an automatic milling machine that shall have improved means for simultaneously securing a plurality of blanks to a number of spindles and have means for simultaneously milling all of the blanks.

Another object of my invention is to provide an automatic milling machine that shall have a bracket for resiliently holding a number of blanks ready to be swung into operative position, a plurality of headstock and tailstock spindles for supporting a plurality of blanks, means for simultaneously moving the tailstock spindles to force a plurality of blanks, when in operative position, into engagement with the chucks carried by the headstock spindles, and means for simultaneously operating the chucks carried by the headstock spindles to hold the blanks which are forced into engagement therewith by the tailstock spindles.

Another object of my invention is to provide an automatic milling machine of the above indicated character that shall have means for automatically indexing all of the blank-carrying spindles upon each reciprocation of the table which carries the spindles, and means for accurately stopping the movement of the table after a predetermined number of reciprocations thereof.

A further object of my invention is to provide an automatic milling machine of the above indicated character that shall be provided with means for preventing the swinging of the blank-carrying bracket into position for connecting the blanks to the spindles except when the table carrying the spindles is near one end of its stroke.

In milling many pieces of work, such for example, as the milling of flutes in reamers or taps, it is desirable to simultaneously operate on a number of blanks in a single machine. Machines for simultaneously milling a number of pieces of work have been constructed and operated heretofore but have not been provided with means for quickly and efficiently loading blanks in the machine.

In a machine constructed in accordance with my invention, a reciprocable table is provided for carrying a number of pieces of work, such for example, as blanks for making reamers or taps. The table is preferably operated by a cam drum and is operated at a greater speed during the return stroke than during the cutting stroke. The table carries a plurality of headstock spindles and a corresponding number of tailstock spindles. The headstock spindles are provided with chucks which may be simultaneously opened and closed for receiving and securing blanks therein. Means is provided for simultaneously moving the tailstock spindles towards the headstock spindles for forcing blanks into enagement with the chucks and for holding the tailstock spindles in any set position. The headstock spindles are geared together in order to index all the spindles after each reciprocation of the table.

A blank-carrying bracket is pivotally mounted upon the table and is provided with means for resiliently holding a number of blanks. The bracket is so mounted upon the table as to permit the swinging of the blanks into position aligned with the headstock and tailstock spindles. When the blanks have been swung into position aligned with the spindles, the tailstock spindles are operated for forcing them into engagement with the headstock spindles. Upon engagement between the headstock spindles and the blanks, the blank-carrying bracket may be easily raised and separated from the blanks. Means is provided for preventing the swinging of the blank-carrying bracket into position for supplying blanks to the spindles except when the table is near one end of its stroke. A bar is also provided for engaging the blank-carrying bracket in its raised position in order to limit the position of the blanks which are inserted in the bracket.

The milling machine is preferably provided with two levers for controlling the operation of the table. One of such levers is moved in one direction for operating the table at a relatively slow speed and is moved in the opposite direction for operating the table at a relatively high speed. The other lever serves to start and stop the movement of the table. Preferably, a disk carrying dogs is mounted on the shaft carrying the cam drum for automatically controlling the operation of the two levers. The starting and stopping lever is not only controlled by the dogs mounted on the disk but is also controlled by a cam member which is operated by a set of gearing connected to the cam drum shaft. The cam member serves to stop the operation of the table after a predetermined number of reciprocations.

The table is provided with means for indexing all of the headstock spindles after each reciprocation thereof. The machine is provided with a plurality of milling cutters which are disposed above the work in the usual manner and are constantly rotated in any suitable manner. The parts of the milling machine, which are not described, preferably, are constructed and operated in the manner shown in the Patent No. 1,231,255, dated June 26th, 1917, to B. M. W. Hanson. In the machine disclosed in this application a number of changes have been made over the machine disclosed in the patent to Hanson. However, the main features are unchanged. My invention chiefly consists in providing a machine disclosed in the Hanson patent with means whereby a plurality of blanks may be conveniently operated on simultaneously.

In the accompanying drawings:

Fig. 2 is an end elevational view of the table with the cover removed.

Fig. 4 is a detailed view of the gearing connected to the cam drum shaft for operating the starting and stopping lever.

Fig. 5 is an end view of the gearing shown in Fig. 4.

Fig. 6 is a plan view of the table and the spindles carried thereby.

Fig. 7 is a side elevational view of the table.

Fig. 8 is a detailed view of a portion of the indexing mechanism.

Fig. 9 is a digrammatic view showing the gearing connections for operating the table.

Fig. 10 is a sectional view of the pin carried by the starting and stopping lever.

Fig. 11 is an end view of the table with parts broken away to show the indexing mechanism.

Fig. 12 is a plan view of the blank carrying bracket.

Fig. 13 is a sectional view through the headstock spindles.

Figure 1:
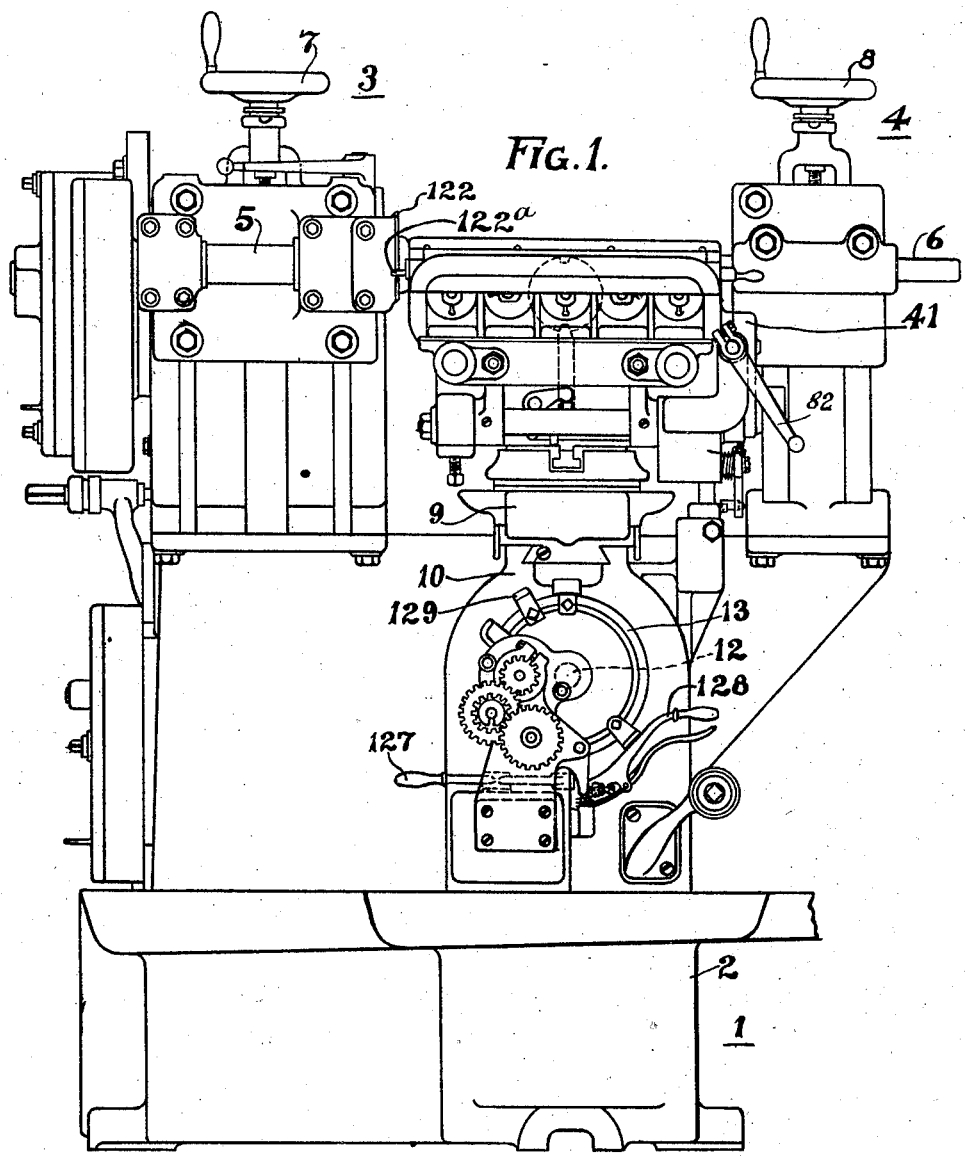
Figure 1 is a front elevational view of a milling machine constructed in accordance with my invention.
Figure 3:
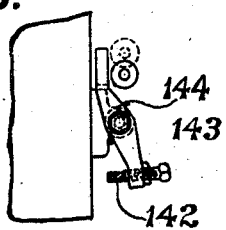
Fig. 3 is a detailed view of a lever for operating a starting and stopping lever.

Referring to the drawings, a milling machine 1 of the type disclosed in the Hanson Patent No. 1,231,255 is illustrated. The machine comprises a main frame 2 which carries a main headstock 3 and a main footstock 4. The headstock 3 rotatably supports a spindle 5 and the footstock 4 rotatably supports a spindle 6. The two spindles 5 and 6 carry a suitable arbor which in turn carries a plurality of milling cutters (not shown). The vertical position of the milling cutters and the spindles 5 and 6 is controlled by the hand wheels 7 and 8 respectively mounted on the headstock 3 and the footstock 4. The milling cutters are rotated in the manner set forth in the patent to Hanson No. 1,231,255.

A reciprocable table 9 is mounted on the main frame of the machine and is movable in a guideway 10. The table is preferably operated by a cam drum 11 which is mounted on a cam shaft 12. A cam groove 13, which is formed on the periphery of the drum, engages a roller (not shown) on the table 9 in the manner set forth in the above mentioned patent to Hanson. The rotary movement of the cam drum serves to reciprocate the table.

The gearing connections for operating the cam shaft 12 and the table 9 are illustrated in Fig. 9 of the drawings. A pulley 14, which is fixedly mounted on a shaft 15, is connected to any suitable source of power and preferably in the manner set forth in the above mentioned patent. The shaft 15 carries a pinion 16 which meshes with a gear wheel 17 on a shaft 18. The shaft 18 carries a pinion 19 which meshes with a gear wheel 20 on a shaft 21. The shaft 21 carries a pinion 22 which meshes with a gear wheel 23 on a shaft 24. The gear wheel 23 meshes with an elongated pinion 25 which is mounted on a shaft 26. The pinion 25 also meshes with a gear wheel 27 which is rotatably mounted on a power shaft 28. The shaft 24 also carries a pinion 29 which meshes with a gear wheel 30 which is rotatably mounted on the power shaft 28. Between the gear wheel 30 and the gear wheel 27, a clutch member 31 is slidably mounted on and keyed to the shaft 28. The clutch member is provided with suitable teeth on one side thereof for engaging corresponding teeth on the gear wheel 30 and is provided with similar teeth on the other side thereof which are adapted to engage corresponding teeth on the gear wheel 27. Thus, when the clutch member 31 is moved in one direction on the shaft 28, the gear wheel 27 is directly connected to the shaft and when the clutch member is moved in the other direction on the shaft, the gear wheel 30 is directly connected to the shaft. A bifurcated end portion 32 of a bell crank lever 33 is adapted to control the operation of the clutch member 31. The bifurcated end portion of the bell crank lever is fitted to a groove 34 on the clutch member 31. The bell crank lever 33 is pivotally connected to and operated by a rod 35. Thus, when the rod 35 is moved in one direction, the gear wheel 30 is connected to the shaft 28 for operating it at a relatively low speed. When the rod 35 is moved in an opposite direction, the gear wheel 27 is connected to the shaft 28 for operating it at a relatively high speed.

A worm member 36, which is rotatably mounted on the shaft 28, meshes with a worm wheel 37 on the cam shaft 12. The worm wheel 37 is indicated by dot and dash lines in Fig. 9 of the drawings. A second clutch member 38 is slidably mounted on the shaft 28. Such clutch member is keyed to the shaft in order to rotate therewith. Suitable teeth are formed on one end of the clutch member for engaging corresponding teeth on the end of the worm member 36. Thus, when the clutch member 38 is moved in one direction, the worm member is connected to and rotated by the shaft 28. A bell crank lever 39 is provided for shifting the clutch member into and out of operative relation to the worm member. The bell crank lever 39 is controlled by a starting and stopping rod 40.

The receptacle table 9 is preferably provided with a drop table mechanism such as is disclosed in the patent to B. M. W. Hanson 1,347,778, dated July 27th, 1920. A spindle supporting frame 41 is mounted on the table 9. The frame 41 carries a plurality of headstock spindles 42 which are adapted to support a plurality of blanks to be milled. The headstock spindles 42 are similar in construction and operation and accordingly only one of them will be described in detail. Referring to the headstock spindle shown in section in Fig. 6 of the drawings, a collet chuck 43 is shown connected to a sleeve 44. The sleeve, at the rear end thereof, is engaged by levers 45 and is slidably supported in a sleeve member 46. The sleeve member 46 is suitably supported on the frame 41. A collar 47, which is slidably mounted on the sleeve member 46, is provided with a cam shaped nose portion 48 which is adapted to engage one end of the levers 45. Thus, when the collar member 47 is moved towards the left, as shown in Fig. 6 of the drawings, the levers 45 are given a movement of rotation in such direction as to force the sleeve 44 and collet chuck 45 outwardly or towards the right, as shown in Fig. 6 of the drawings. The collet chuck 43 engaging the nose cap 49 is forced into engagement with a blank.

A rod 50 extends through the sleeve 44 and serves to limit the position of the blank in the headstock. A spring member 51 is mounted on the rod 50 between a shoulder 52 thereon and a block 53 which is secured in the end of the sleeve 46. Nuts 54 are fastened to the end of the rod for limiting its forward movement. A gear wheel 55, which is fixedly mounted on the sleeve 46, meshes with similar gear wheels which are mounted on the other spindles 42. Said gear wheels serve to index the spindles after each reciprocation of the table 9. The gear wheel 55 on the central headstock spindle meshes with a gear wheel 56, as shown in Figs. 7 and 13 of the drawings. The gear wheel 56 is mounted on the shaft 57 and is fixedly connected to a bevel pinion 58. The bevel pinion 58 meshes with a bevel pinion 59 which is mounted on a shaft 60. The shaft 60 carries a gear wheel 61 and is preferably connected to such gear wheel through a sliding or friction clutch. A typical and well known friction clutch is illustrated in Fig. 8 of the drawings and a detailed description thereof is deemed unnecessary. By means of such clutch the gear wheel 61 may be rotated without effecting rotation of the shafts 60 and 57 and of the spindles 42 which are connected to such shafts.

The gear wheel 61 meshes with a gear segment 62 which is pivotally mounted on the side of the machine, as shown in Fig. 7 of the drawings. The gear segment 62 is provided with an arm 63 which carries a roller 64. The roller 64 is adapted to engage a bolt 65 near the end of the forward or cutting stroke of the table and is adapted to engage a second bolt 66 near the end of the return movement of the table. The bolts 65 and 66 are suitably secured to a bracket 67 which is bolted to the side of the spindle frame 41. When the roller 64 engages the bolt 66 near the end of the return movement of the table, the gear wheel 61 is given a movement of rotation for indexing the headstock spindles 42 in a manner to be hereinafter set forth.

The central headstock spindle 42 carries an indexing disk 68, as shown in Figs. 2, 6, 7 and 11. Notches 69 are formed in the periphery of the disk 68. The number of notches corresponds to the number of flutes which are to be milled in each of the blanks. A plunger 70 is slidably supported in a suitable bracket 71 below the disk 68. The plunger 70 has an end portion which is adapted to enter the notches 69 formed in the disk 68. A spring member 72, which is located within a hollow portion of the plunger, serves to force the plunger towards the disk 68. A lug 73, which projects from the side of the plunger, as shown in Figs. 2, 6, 7 and 11 of the drawings, is adapted to be engaged by a pivotally mounted latch 74. The latch member 74, which is in the form of a bell crank lever, has one end in engagement with a rod 75. The opposite end of the rod 75 engages one arm of a bell crank lever 76. The lever 76 is operated by a disk member 77. The disk member 77 is pivotally mounted on the side of the frame 41 and is resiliently held in engagement with the bell crank lever 76 by means of a spring member 78. The disk 77 carries a pin 79 which cooperates with a cam member 80 on the bracket 67. Thus, when the table is moved towards the left, as shown in Fig. 7 of the drawings, the pin 79 engages the inclined end portion of the cam member 80 and raises the disk 77 to give the bell crank lever 76 a movement of rotation. The rotative movement of the lever 76 shifts the rod 75 towards the left, as shown in Fig. 2 of the drawings. Such movement of the rod 75 gives the latch member 74 a movement of rotation in a clockwise direction, as shown in Fig. 2 of the drawings, for withdrawing the plunger 70 from engagement with the indexing disk 68. When the plunger 70 is withdrawn from engagement with the disk 68, the various headstock spindles 42 may be indexed upon engagement between the bolt 66 and the roller 64 on the end of the arm 63. Upon further movement of the table towards the left, as shown in Fig. 7 of the drawings, the pin 79 drops below the projecting portion of the cam member 80 and accordingly permits the disk 77 to be lowered for moving the rod 75 towards the right, as shown in Fig. 2 of the drawings. The movement of the rod towards the right and also the movement of the plunger 70 into engagement with the disk 68 is effected by means of the spring member 72 which is located within the plunger member. The plunger member engages the disk 68 before any extended movement thereof has been effected by the operation of the gear segment 62. Thus, when the gear segment rotates the indexing disk 68 to the correct position, the plunger enters one of the notches 69 and prevents further movement of the headstock spindles.

The chucks 43 on the headstock spindles 42 are opened and closed by means of a crank 82 which is mounted on a shaft 83 shown in Figs. 1, 6 and 7 of the drawings. The shaft 83 carries a worm 84 which meshes with a worm segment 85. The worm segment 85 is keyed to a shaft 86. The shaft 86 also carries two levers 87 which operate a block member 88 for opening and closing the collet chucks. The block 88 carries two sets of screws 89 which are engaged by the ends of the levers 87. Bifurcated arms 90, which project from the block 88, are fitted to grooves 91 on the collar members 47. Thus, when the crank 82 is rotated in one direction all of the collet chucks 43 on the headstock spindles 42 are opened for receiving blanks and when the crank is given a movement of rotation in the opposite direction, the collet chucks are closed for holding the blanks.

A plurality of tailstock pins 95 are aligned with the headstock spindles 42. The pins 95 are secured to a tailstock block 96 in any suitable manner as by means of screws 97. Grooves 98 are formed in the pins 95 to permit the free movement of the milling cutters (not shown) past them. The block 96 is slidably mounted on a tailstock slide 99 and is secured to the slide by means of bolts 100. Upon loosening of the bolts 100, adjustment of the block relative to the slide may be effected by means of a screw 101.

A shaft 102, which is mounted on the slide 99, is directly connected to two crank arms 103 by means of two links 104. The crank arms 103 are fixedly mounted on a shaft 105. The shaft 105 carries a gear wheel 106 which meshes with a gear wheel 107. The gear wheel 107 meshes with a gear wheel 108 which is mounted on a shaft 109. The shaft 109 carries an operating crank arm 110. Thus, upon operation of the crank arm 110, the tailstock slide and the tailstock pins may be moved toward or away from the headstock spindles 42. A bolt 111, which is fitted in the end of the slide 99 serves to engage the end of the frame 41, and to limit the forward movement of the tailstock spindles. Bolts 112, which are secured to brackets 113 on the sides of the frame 41, serve to limit the position of the crank arms 103. The bolts 112 and 111 are preferably so adjusted as to hold the tailstock spindles in any set positions. The bolt 111 should be so adjusted as to engage the ends of the frame 41 prior to the movement of the center line of the links 104 beyond a line drawn through the axes of the shafts 102 and 105. By so adjusting the parts, the crank arms 103 are resiliently held in engagement with the bolts 112 by the resiliency of the various parts of the tailstock mechanism.

The spindle-carrying frame 41 is pivotally supported on the table 9 by means of bolts 115 and is held in any set position by means of bolts 116. By so mounting the spindle frame on the table, the spindles may be inclined at any suitable angle for cutting flutes having an inclination with respect to the axes of the blanks.

A blank-carrying bracket 117 is pivotally supported on the frame 41 above the headstock spindles 42 by studs or pivots 117ª. The bracket 117 is provided with a number of grooves 118 formed in the top thereof for carrying a number of blanks corresponding to the number of spindles on the table. The blanks are resiliently held in the grooves 118 by means of levers 119. The levers 119 are resiliently forced into engagement with the blanks by means of spring members 120. A handle 121 is fastened to the bracket 117 for swinging it into the position indicated by dot and dash lines in Fig. 7 of the drawings. When the bracket 117 is in the position shown in dot and dash lines in Fig. 7 of the drawings, the tailstock spindle pins are simultaneously moved forward by the crank arm 110 for forcing the blanks into engagement with the chucks 43. When the blanks have been engaged by the chucks, the bracket may be easily raised and separated from them. A bracket 122, which projects from the headstock 3, serves to prevent the swinging of the blank-carrying bracket 117 into the position shown in dot and dash lines in Fig. 7 except when the table is near the end of its stroke. Such bracket 122 also serves to prevent the blanks carried by the bracket 117 being moved into contact with the rotating milling cutters. For this purpose a pin 122$^a$ is provided outstanding from the side of the frame 117 and adapted to be engaged by the front wall of the bracket 122.

A bar 123, which is pivotally mounted on the spindle frame 41 as at 123$^a$ is normally forced into engagement with the member 117 by means of spring members 125. The blank-carrying bracket is provided with arms 126 for engaging the bar 123 and forcing it into the position shown in Fig. 7. The bar 123 serves to limit the positions of the blanks in the blank-carrying bracket. When loading the bracket 117, the blanks are forced into the grooves 118 in the bracket and into engagement with the bar 123.

A speed controlling lever 127 is connected to the end of the rod 35 which controls the rotative speed of the cam drum. A starting and stopping lever 128 is connected to the end of the rod 40 which controls the starting and stopping of the movement of the cam drum. The levers 127 and 128 are automatically controlled by dogs 129 which are mounted on a disk 130. The disk 130 is mounted on the cam shaft 12. The levers 127 and 128 are controlled by the dog members in the manner disclosed in the patent to B. M. W. Hanson 1,231,255.

It is desirable to automatically stop the operation of the machine when a certain number of flutes have been cut in the blanks. According to my invention a system of gearing is directly connected to the cam shaft 12 for controlling the operation of the starting and stopping lever 128. The gear wheel 132, which is connected to the end of the cam shaft 12, meshes with a gear wheel 133 which is mounted on a short shaft 134. The shaft 134 carries a second gear wheel 135 which meshes with a gear wheel 136. The gear wheel 136 is mounted on a shaft 137 which carries a second gear wheel 138. The gear wheel 138 meshes with a gear wheel 139 which is mounted on a shaft 140. The shaft 140 carries a cam member 141 near the inner end thereof. The cam member 141 is adapted to operate a bell crank lever 142. The bell crank lever 142 is in engagement with a pivotally mounted lever 143. A spring member 144 is provided for normally holding the lever 143 in engagement with bell crank lever 142. The gearing connection between the cam shaft 12 and the cam member 141 is so constructed as to effect operation of the bell crank lever 142 after a predetermined number of revolutions of the cam drum or reciprocations of the table.

The starting and stopping lever 128 carries a pin 145 which engages the dogs 129 on the disk 130. The pin 145 is raised out of the path of movement of the dogs by a latch 146 when the rod 40 is moved for starting the rotation of the cam drum. Upon raising of the pin 145, the lever 143 engages a shoulder portion 147 of a collar which is connected to the pin. The lever 143 holds the pin out of the path of movement of the dogs on the disk 130 until the cam member 141 engages the bell crank lever 142. The bell crank lever 142 operates the lever 143 to release the pin 145 and permit it to be moved in the path of movement of the dogs. The releasing of the pin 145 is so timed as to permit a dog to engage it shortly thereafter for stopping the movement of the cam drum.

In the above described machine, the blank-carrying bracket 117 and the parts connected thereto permit the moving of a plurality of blanks to operative position in a quick and easy manner. The two crank arms 82 and 110, which respectively control the headstock spindles and the tailstock spindles permit the simultaneous connection of a plurality of blanks with the headstock and tailstock spindles. The system of gearing which is connected to the end of the cam shaft 12 controls the operation of the starting and stopping lever 128 in such a manner as to stop the operation of the cam drum after a predetermined number of reciprocations of the table.

Modifications in the machine and in the arrangement and location of parts may be made within the spirit and scope of my invention and such modifications are intended to be covered by the appended claims.

What I claim is:

1. In a milling machine, the combination with a table and means comprising a cam drum for reciprocating said table, of means comprising a system of gearing directly connected to said cam drum for stopping the operation thereof after a predetermined number of reciprocations.

2. In a milling machine, the combination with a table, means comprising a cam drum for reciprocating said table, and a system of gearing operated in accordance with the rotation of said drum, of means comprising a lever for starting and stopping the operation of said cam drum, and a cam member operated by said system of gearing for placing said lever in position to stop the movement of the table after a predetermined number of reciprocations thereby.

3. In a milling machine, the combination with a table, a cam drum mounted on a cam shaft for reciprocating the table, and a system of gearing operated by said cam shaft, of means comprising a lever for starting and stopping the operation of said cam drum, and means comprising a cam member controlled by said system of gearing for operating said lever to stop the cam drum after a predetermined number of reciprocations by said table.

4. In a milling machine, the combination with a table, a cam drum mounted on a cam shaft for reciprocating the table, a system of gearing directly connected to said shaft, a disk mounted on said shaft and carrying a plurality of dogs, and means comprising a lever controlled by said dogs for starting and stopping the operation of the cam drum, of means for holding said lever in position for continued operation of the cam drum, and means comprising a cam member operated by said gearing system for releasing the lever to stop the cam drum after a predetermined operation thereof.

5. In a milling machine, the combination with a table, a cam drum mounted on a cam shaft for reciprocating the table, a system of gearing directly connected to said shaft, a disk mounted on said shaft and carrying a plurality of dogs, means comprising a lever controlled by said dogs for governing the speed of rotation of said cam drum, and means comprising a second lever for starting and stopping the operation of said cam drum, of means for holding said second lever in position for continued operation of the cam drum, and means comprising a cam member operated by said gearing system for releasing said second lever to stop the cam drum after a predetermined operation thereof.

6. In a metal cutting machine, the combination with a table carrying a spindle, means for reciprocating said table, and means for automatically indexing said spindle upon each of reciprocation of said table, of means comprising a system of gearing directly connected to said reciprocating means for stopping the operation thereof upon a predetermined number of indexing operations.

7. In a metal cutting machine, the combination with a table carrying a spindle, means comprising a cam drum for reciprocating said table, and means for automatically indexing said spindle upon each reciprocation of said table, of means comprising a system of gearing directly connected to said cam drum for stopping the operation thereof upon a predetermined number of indexing operations.

8. In a metal cutting machine, the combination with a table carrying a plurality of spindles, means comprising a cam drum mounted on a cam shaft for reciprocating said table, and means for automatically indexing all said spindles upon each reciprocation of said table, of means comprising a system of gearing directly connected to said cam shaft for stopping the operation of the machine upon a predetermined number of indexing operations.

9. In a metal cutting machine, the combination with a table, a plurality of spindles mounted on said table, means for reciprocating the table, and means for indexing said spindles upon each reciprocation of the table, of means directly connected to the table reciprocating means for stopping the table movement after a predetermined number of reciprocations.

10. In a metal cutting machine, the combination with a table, a plurality of spindles mounted on said table, means for reciprocating said table, and means for indexing said spindles upon each reciprocation of the table, of means comprising a system of gearing directly connected to said table reciprocating means for stopping the operation of the table after a predetermined number of reciprocations thereof.

11. In a milling machine, the combination with a table, a plurality of headstock spindles and a corresponding number of tailstock spindles mounted on said table, and a blank-carrying bracket pivotally mounted on said table so that the blanks may be swung into alignment with said headstock and tailstock spindles, of means for simultaneously securing all of the blanks on said bracket between the headstock and the tailstock spindles when swung into alignment therebetween.

12. In a milling machine, the combination with a table, a plurality of headstock and tailstock spindles mounted on said table, a blank-carrying bracket mounted on said table, and means on said bracket for yieldingly holding a number of blanks, said bracket being so pivotally mounted on the table that the blanks may be swung into alignment with said spindles, of means for simultaneously securing all of the blanks on said bracket between the headstock and tailstock spindles when swung into alignment therebetween.

13. In a milling machine, the combination with a reciprocable table, a plurality of headstock and tailstock spindles mounted on said table, each of said headstock spindles having a collet chuck for holding a blank, and a blank-carrying bracket having yieldable means for holding a plurality of blanks, said bracket being so pivotally mounted on the table that the blanks carried thereby may be swung into alignment with said headstock and tailstock spindles, of means for simultaneously moving all of said tailstock spindles into engagement with the blanks on the bracket when swung into alignment therewith to force the blanks into engagement with said collet chucks, and means for simultaneously operating said chucks to engage said blanks.

14. In a milling machine, the combination with a reciprocable table, a plurality of headstock and tailstock spindles mounted on said table, each of said headstock spindles having a collet chuck for holding a blank, and a blank-carrying bracket having yieldable means for holding a plurality of blanks, said bracket being so pivotally mounted on the table that the blanks carried thereby may be swung into alignment with said headstock and tailstock spindles, of means for simultaneously moving all of said tailstock spindles into engagement with the blanks on the bracket when swung into alignment therewith to force the blanks into engagement with said collet chucks, said last named means also serving to hold the tailstock spindles in any set position, and means for simultaneously operating said chucks to engage said blanks.

15. In a milling machine, the combination with a reciprocable table, a plurality of spindles mounted on said table, a blank-carrying bracket pivotally mounted on said table and adapted to move the blanks into alignment with said spindles, and means mounted on the frame of the machine for preventing the swinging of the bracket to bring the blanks carried thereby into alignment with the spindles except when the table is near one end of its stroke, of means for automatically and simultaneously securing all the blanks on the bracket to said spindles.

16. In a milling machine, the combination with a reciprocable table, a plurality of headstock and tailstock spindles mounted on said table, and a bracket having resilient means for holding a number of blanks to be connected to said spindles, said bracket being so pivotally mounted on the table that the blanks carried thereby may be swung into alignment with said spindles, of a bar pivotally mounted on said table and resiliently forced away from said bracket, means mounted on said bracket for engaging the bar upon raising of the bracket and for forcing the bar into engagement with the bracket, said bar serving to limit the position of the blanks when in engagement with the bracket.

17. In a milling machine, the combination with a reciprocable table, a plurality of headstock and tailstock spindles mounted on said table, a bracket having yieldable means for holding blanks, said bracket being so pivotally mounted on the table that the blanks on the bracket may be simultaneously swung into alignment with said spindles, a bar pivotally mounted on the table and resiliently forced away from said bracket, said bar serves to limit the position of the blanks in the bracket, and arms projecting from said bracket for engaging the bar and forcing it into engagement with the bracket upon raising of the bracket, of means for simultaneously securing all the blanks carried by the bracket to said spindles.

18. In a milling machine, the combination with a reciprocable table, a plurality of headstock and tailstock spindles mounted on said table, a blank-carrying bracket pivotally mounted on said table so that the blanks may be swung into alignment with said spindles, and means mounted on the frame of the machine for preventing the swinging of the blanks into alignment with said spindles except when the table is in a predetermined position, of means for simultaneously securing all of the blanks on said bracket between the headstock and tailstock spindles when swung into alignment therebetween.

19. In a milling machine, the combination with a reciprocable table, a plurality of spindles mounted on said table, a blank-carrying bracket pivotally mounted on said table and adapted to swing the blanks carried thereby into alignment with said spindles, and means mounted on the frame of the machine for preventing the swinging of the bracket to bring the blanks carried thereby into alignment with the spindles except when the table is near one end of its stroke, of a bar pivotally mounted on the table and resiliently held away from the bracket, and means mounted on said bracket for engaging the bar upon raising of the bracket and for forcing the bar into engagement with the bracket, said bar serving to limit the position of the blanks when in engagement with the bracket.

In testimony whereof, I hereto affix my signature.

CARL SCHRAMM.